(12) United States Patent
Kakino

(10) Patent No.: US 6,501,997 B1
(45) Date of Patent: Dec. 31, 2002

(54) NUMERICAL CONTROLLING DEVICE AND TOOLING APPARATUS HAVING THEREOF

(75) Inventor: Yoshiaki Kakino, 265-5, Iwakura-hanazono-cho, Sakyo-ku, Kyoto 606-0024 (JP)

(73) Assignees: Yoshiaki Kakino, Kyoto (JP); Osaka Kiko Co., Ltd., Osaka (JP); Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/139,645

(22) Filed: Aug. 25, 1998

(30) Foreign Application Priority Data

Aug. 25, 1997 (JP) .............................. 9-228587
Aug. 11, 1998 (JP) ........................... 10-227406

(51) Int. Cl.[7] .............................. G05B 13/02
(52) U.S. Cl. ....................... 700/28; 700/29; 700/37; 700/159; 700/245; 700/246; 700/193; 318/568.1; 318/568.13; 318/568.17; 318/570; 318/571; 318/569; 82/118; 82/119; 82/120; 483/131; 483/132; 483/31; 483/36
(58) Field of Search ................... 700/28–29, 86–89, 700/159, 295–296, 251–252, 254, 180, 183–185, 37, 193–194, 160–162; 29/171–178, 27 A–27 C; 318/568.1, 568.13, 568.14, 568.15, 568.17, 568.18, 570–571, 572, 573, 569; 82/118–120, 131–133; 483/31–36; 408/3–9

(56) References Cited

U.S. PATENT DOCUMENTS

| | | | | |
|---|---|---|---|---|
| 4,150,327 A | | 4/1979 | Camera et al. ............. 318/568 |
| 4,433,382 A | * | 2/1984 | Cunningham et al. ....... 700/192 |
| 4,521,860 A | * | 6/1985 | Kanematsu et al. ........ 700/181 |
| 4,609,855 A | | 9/1986 | Andrews ..................... 318/561 |
| 4,706,002 A | * | 11/1987 | Fukuyama ................... 318/568 |
| 4,786,848 A | * | 11/1988 | Nickerson ................... 318/567 |
| 4,803,640 A | * | 2/1989 | Mitomi et al. ............... 700/252 |
| 4,833,617 A | | 5/1989 | Wang .......................... 700/187 |
| 5,003,237 A | | 3/1991 | Kimura ........................ 318/572 |
| 5,270,915 A | * | 12/1993 | Tomita et al. ............... 700/184 |
| 5,532,932 A | * | 7/1996 | Niwa ........................... 700/181 |
| 5,563,484 A | * | 10/1996 | Otsuki et al. ............ 318/568.15 |
| 5,587,638 A | | 12/1996 | Kato et al. ............. 318/568.14 |
| 5,654,894 A | | 8/1997 | Tsutsui ........................ 700/182 |
| 5,819,202 A | * | 10/1998 | Sato et al. ..................... 702/33 |
| 5,870,306 A | * | 2/1999 | Harada ........................ 700/181 |
| 5,872,894 A | * | 2/1999 | Watanabe et al. ........... 700/252 |
| 5,930,460 A | * | 7/1999 | Nomaru et al. ............. 700/245 |
| 6,107,768 A | * | 8/2000 | Ouchi et al. ............. 318/568.1 |

* cited by examiner

*Primary Examiner*—Ramesh Patel
(74) *Attorney, Agent, or Firm*—Arent Fox Kintner Plotkin & Kahn

(57) ABSTRACT

A numerical controlling device and a tooling apparatus having thereof, in which performance required for the machining is greatly improved correspondingly to a degree of importance according to a type of the machining and thus high efficiency and high accuracy in the machining can be obtained, by referring a database based on a type of a specified cutting tool and workpiece, and of a machining mode including an operating path of a movement of the cutting tool and workpiece, and by selecting a control parameter which relates to an adequate operating speed and operating position in the entire operating path during machining and non-machining.

12 Claims, 11 Drawing Sheets

(2 of 11 Drawing Sheet(s) Filed in Color)

NUMERICAL CONTROLLING DEVICE AND TOOLING APPARATUS HAVING THEREOF

BACKGROUND OF THE INVENTION

The present invention relates to a numerical controlling device which can greatly improve performances required respectively for various machining without lowering other performances by applying the device to a tooling apparatus for performing the various machining and a tooling apparatus having thereof.

Numerical control in the tooling apparatus is made in such a manner that a cutting tool and machining table are relatively moved along an operating path which is numerically specified previously and that the predetermined machining is given to a workpiece on the machining table. In this kind of the numerical control, in order to satisfy performances required for various machining such as an improvement in machining efficiency, in machining accuracy, and in tool life, a method for optimizing an operating speed of the relative movement has been conventionally suggested as follows.

The first method is adaptive control. In this method, a quantity of state which influences the machining accuracy and the tool life such as a cutting force and a vibration acceleration are detected during actual machining. The operating speed is increased as much as possible under the condition that the detected results do not exceed a predetermined allowable range, and thus the machining efficiency is improved.

The second method is for utilizing a machining condition database. In this method, as for various combinations of the cutting tools and workpieces, machining conditions which respectively conform to the various combinations are previously obtained, and a database is made up by these conditions for the convenience of utilization. And for performing the machining, a corresponding machining condition is read out from the database, and a machining program is automatically created according to the machining condition, and the machining operation is performed according to the machining program.

The third method is a servo parameter adequate selection. In this method, servo parameters which were previously determined in the servo units of the numerical controlled tooling apparatus is selected according to characteristics of individual tooling apparatuses, and while the machining accuracy is being improved by reducing a tracking error, to improve the machining efficiency.

However, in the first method, a sensor, which accurately detects a quantity of state required for the detection of the cutting force and vibration acceleration with satisfactory practical sensitivity, has not been introduced for practical use. For this reason, when the operating speed is determined based on the inaccurately detected result of the sensor, in order to take precautions against possible accidents such as damages to the cutting tools, it is necessary to expect a sufficient safety factor, and thus the improvement in the machining efficiency cannot be expected.

In addition, the machining condition database used in the second method is arranged so as not to substantially require input of the machining conditions for each machining but so as to expect safety for wide application to the combinations of the cutting tools and workpieces. For this reason, even if the machining operation is performed according to the database, there arises a problem that the machining efficiency is not improved.

Moreover, in the third method, the servo parameters to be selected are limited to a velocity loop gain used in determining the operating speed. In addition, this selection is performed without considering a difference in a degree of importance according to types of machining with respect to the required performances (machining efficiency, machining accuracy, and tool life, etc.), so a degree of improvement in an actually obtained tracking error is small (approximately 20 to 30%).

In the aforementioned conventional methods, an improving effect to be expected is generally small. For example, when a high-powered tooling apparatus which is feasible for the high machining speed and cutting tools with high rigidity are used, similar or better effects can be obtained more securely and easily. Therefore these methods have been hardly practiced in the present situation.

Moreover, the machining condition database used in the second method should be updated at each time according to an improvement in the machining technologies such as development of new materials for the tools, so if this update is neglected, the machining efficiency is lowered otherwise.

BRIEF SUMMARY OF THE INVENTION

The present invention has been made with the aim of solving the above problems, and it is one object of the present invention to provide a numerical controlling device in which performances required for various machining using a tooling apparatus can be greatly improved according to a difference in a degree of importance with respect to types of the machining, and thus high machining efficiency and high machining accuracy can be simultaneously obtained by adopting the device, and a tooling apparatus having thereof.

The numerical controlling device of the present invention used in a tooling apparatus in order to move a cutting tool and/or a machining table along an operating path which is previously numerically specified and to give a predetermined machining to a workpiece on the machining table by bringing the cutting tool into contact with the workpiece, characterized in that a control parameter relating to an operating speed and operating position is selected based on a predetermined database in order to obtain an adequate operating speed and operating position through the entire operating path during machining and non-machining, according to a specification of types of the cutting tool and/or workpiece, and of a machining mode including the operating path.

According to the present invention, as for the types of the cutting tool and/or workpiece as well as the operating path of the cutting tool and/or the machining table, namely, the "machining mode", the control parameter relating to the operating speed and operating position is previously obtained through the entire operating path during machining and non-machining, and the database is produced with the parameter. At the time of performing the machining, the control parameter corresponding to the specified machining mode is selected, and the operation is done by a servo unit according to the control parameter. Therefore, the high machining efficiency and high machining accuracy can be obtained simultaneously.

Another numerical controlling device of the present invention is characterized in that the control parameter includes a position loop gain to be multiplied in order to obtain a position changing command based on an operating position command and a velocity loop gain to be multiplied in order to obtain an operating speed command based on the obtained position changing command.

According to the present invention, the velocity loop gain as the control parameter relating to the operating speed and the position loop gain as the control parameter relating to the operating position is included respectively into each control parameter. Therefore, the position accuracy is improved and the operating speed is increased at the same time, and thus the machining accuracy can be maintained and the machining efficiency can be improved simultaneously.

Still another numerical controlling device of the present invention is characterized in that internal state of the servo unit for operating the cutting tool and/or the machining table are detected and stored data in the database are updated based on the detected result.

According to the present invention, the internal state of the servo unit of the tooling apparatus during machining operation is detected by a suitable sensor wherein the internal state is such as a driving electric current of a driving motor of the cutting tool and/or the machining table. If this detected result has a predetermined margin, the stored data in the database is updated according to the result. Therefore, the database can be prevented from becoming obsolete due to improvement in machining technologies.

Still another numerical controlling apparatus of the present invention is characterized in that the updating means includes a display unit for displaying that the updating is possible and an input unit for accepting an operation by an operator. Moreover, the updating is performed based on a predetermined operation on the input unit operated according to the display on the display unit.

According to the present invention, when the updating means is in the enable state of updating the database, this state is displayed on the display unit. As a result, this induces the operator to perform a confirming operation. Only when this operation is performed, the updating is performed. Therefore, inadequate updating due to disturbance such as detection failure by the sensor or idle updating can be prevented.

Still another numerical controlling device of the present invention is characterized in that just when the cutting tool and/or the machining table reach an end position of the operating path, they are operated in a direction opposite to that of the operation until reaching the end position.

In addition, still another numerical controlling device of the present invention is characterized in that a time constant of the velocity loop is selected so that a time constant of the position loop is decreased as small as possible and machining time based on the time constant of the position loop becomes minimum.

According to these invention, by performing the opposite operation at a speed as fast as possible, the machining time becomes the shortest at the time when the cutting tool reaches the end position of the operating path, and thus time that the cutting tool slips ("rubs") against the workpiece can be reduced.

The tooling apparatus of the present invention has the numerical controlling device with the aforementioned arrangement, and performs a predetermined machining according to a control command from the numerical controlling device.

According to the present invention, since the predetermined machining is performed by using the numerical controlling device, the aforementioned effects of the numerical controlling device can be obtained as the tooling apparatus.

The above and further objects and features of the invention will more fully be apparent from the following detailed description with accompanying drawings.

BRIEF DESCRIPTION OF THE SEVERAL VIEWS OF THE DRAWINGS

The patent or application file contains at least one drawing executed in color. Copies of this patent or patent publication with color drawing(s) will be provided by the Office Upon request and payment of the necessary fee.

DETAILED DESCRIPTION OF THE INVENTION

The present invention will now be described in detail referring to the accompanying drawings illustrating the embodiment thereof.

Figure 1:
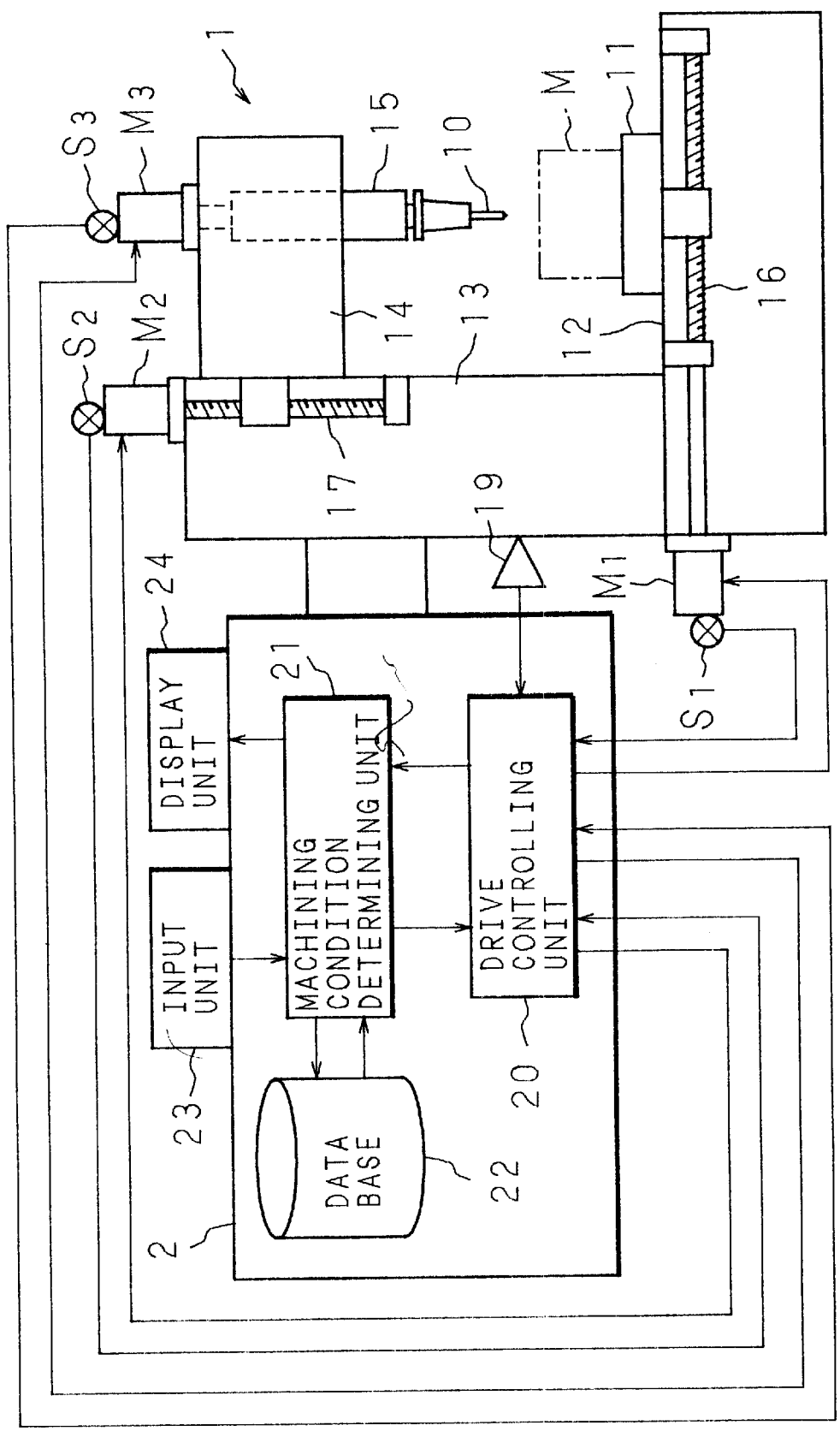
FIG. 1 is a schematic block diagram showing an arrangement of a numerical controlling device of the present invention and a tooling apparatus having thereof.

FIG. 1 is a schematic block diagram showing an arrangement of a numerical controlling device of the present invention, and a tooling apparatus having thereof.

A tooling apparatus 1 shown in the drawing has a drill 10 as a cutting tool, and the apparatus 1 is composed as a drilling machine for giving a drilling to a workpiece M on a machining table 11. However, the application scope of the present invention is not limited to this, so the present invention can be applied also to other tooling apparatuses such as an end mill, face mill, and lathe. Moreover, the tooling apparatus 1 of the present invention is useful particularly in a machining center which is composed in such a manner that a plurality of tools are previously placed on a machining head and plural types of machining can be performed as exchanging the tools.

The tooling apparatus 1 has a bed 12 which is placed so that its upper surface is kept exactly horizontal. The machining table 11 is provided so as to freely move in two directions (X and Y directions) which intersect perpendicularly to each other on the upper surface of the bed 12. Moreover, a column 13 is provided so as to stand on one side of the bed 12, and a spindle head 14 is supported to the column 13 so as to freely move in a vertical direction (Z direction). The drill 10 as a cutting tool is mounted detachably to a lower end of a spindle 15 protruded from a lower portion of the spindle head 14 in a vertically lower direction via a suitable mounting means.

One portion of the machining table 11 is screwed through by a feed screw shaft 16 protruded along the upper surface of the bed 12, and the machining table 11 moves along the upper surface of the bed 12 according to rotation of the feed screw shaft 16 driven by a table feed motor (X and Y axes motor) $M_1$. Here, in the drawing, only the feed screw shaft 16 and the feed motor $M_1$ for feeding in one of the directions are shown, but the machining table 11 can be moved in the X and Y direction as mentioned above by providing the same mechanism to a direction which intersects perpendicularly to the direction.

Meanwhile, one portion of the spindle head 14 is screwed through by a feed screw shaft 17 supported vertically inside of the column 13, and the spindle head 14 moves in an up-and-down direction according to rotation Of the feed screw shaft 17 driven by a tool feed motor (Z axis motor) $M_2$. Moreover, an upper end of the spindle 15 is connected to a spindle motor $M_3$ mounted to an upper portion of the spindle head 14, and the spindle 15 together with the drill 10 mounted to the lower end are rotated by the spindle motor $M_3$ about these common axes. Here, in FIG. 1, for convenience of the drawing, the spindle motor $M_3$ is mounted to the outside of the spindle head 14, but particularly a tooling apparatus for high speed machining generally adopts a built-in type where the spindle motor $M_3$ is built inside of the spindle head 14.

In the tooling apparatus 1 having the aforementioned arrangement, the drill 10 as a cutting tool is mounted to the spindle 15 of the spindle head 14, and the workpiece M to be machined is fixed onto the machining table 12 by a suitable fixing means, and the table feed motor $M_1$ and tool feed motor $M_2$ are driven while the drill 10 being rotated by the spindle motor $M_3$, and the workpiece M on the machining table 12 and the drill 10 mounted to the spindle head 14 are operated along the operating path which is numerically specified previously, and the workpiece M undergoes a predetermined machining (in this case, drilling).

At the above machining, the table feed motor $M_1$ together with the tool feed motor $M_2$, and the spindle motor $M_3$ are driven relatively in connection with each other by an operating command given from a numerical controlling unit 2. The numerical controlling unit 2 contains a drive controlling unit (servo amplifier) 20 for controlling the table feed motor $M_1$, the tool feed motor $M_2$ and the spindle motor $M_3$, a machining condition determining unit 21 for determining a machining condition in the drive controlling unit 20, and a database 22 which is referred to when the machining condition is determined. The numerical controlling unit 2 also has an input unit 23 for accepting an input by an operator and a display unit 24 for displaying as mentioned above.

In FIG. 1, the numerical controlling unit 2 as well as the input unit 23 and the display unit 24 are arranged on a control box provided integrally with the column 13 of the tooling apparatus 1, but in recent years a CNC (Computerized Numerical Control) tooling apparatus, which utilizes a computer having a regular CPU as the numerical controlling unit 2, has been the mainstream. The present invention can be applied also to such a type of the tooling apparatuses. In this case, accessory input means such as a keyboard and a mouse can be used as the input unit 23, and accessory display means such as a CRT display and a liquid crystal display can be used as the display unit 23.

In the tooling apparatus 1 to be controlled, results, which are obtained by detecting a driving current by means of electric current sensors $S_1$, $S_2$, and $S_3$ as means for detecting internal states of the servo unit for operating the drill 10 and machining table 11, wherein these sensors $S_1$, $S_2$, and $S_3$ are provided to the table feed motor $M_1$, tool feed motor $M_2$, and spindle motor $M_3$, are given to the drive controlling unit 10 as feedback signals. Moreover, results which are obtained by detecting relative operating positions and operating speeds of the drill 10 and machining table 11 are given as feedback signals from a position sensor 19 provided at a suitable position of the tooling apparatus 1 to the drive controlling unit 2.

The drive controlling unit 20 is connected to the machining condition determining unit 21 so that data can be exchanged therebetween, and as mentioned below, the table feed motor $M_1$, tool feed motor $M_2$, and spindle motor $M_3$ are driven based on the deviation between an operating command given from the machining condition determining unit 21 and a feedback signal representing the current operating positions of the drill 10 and the machining table 11.

Figure 2:
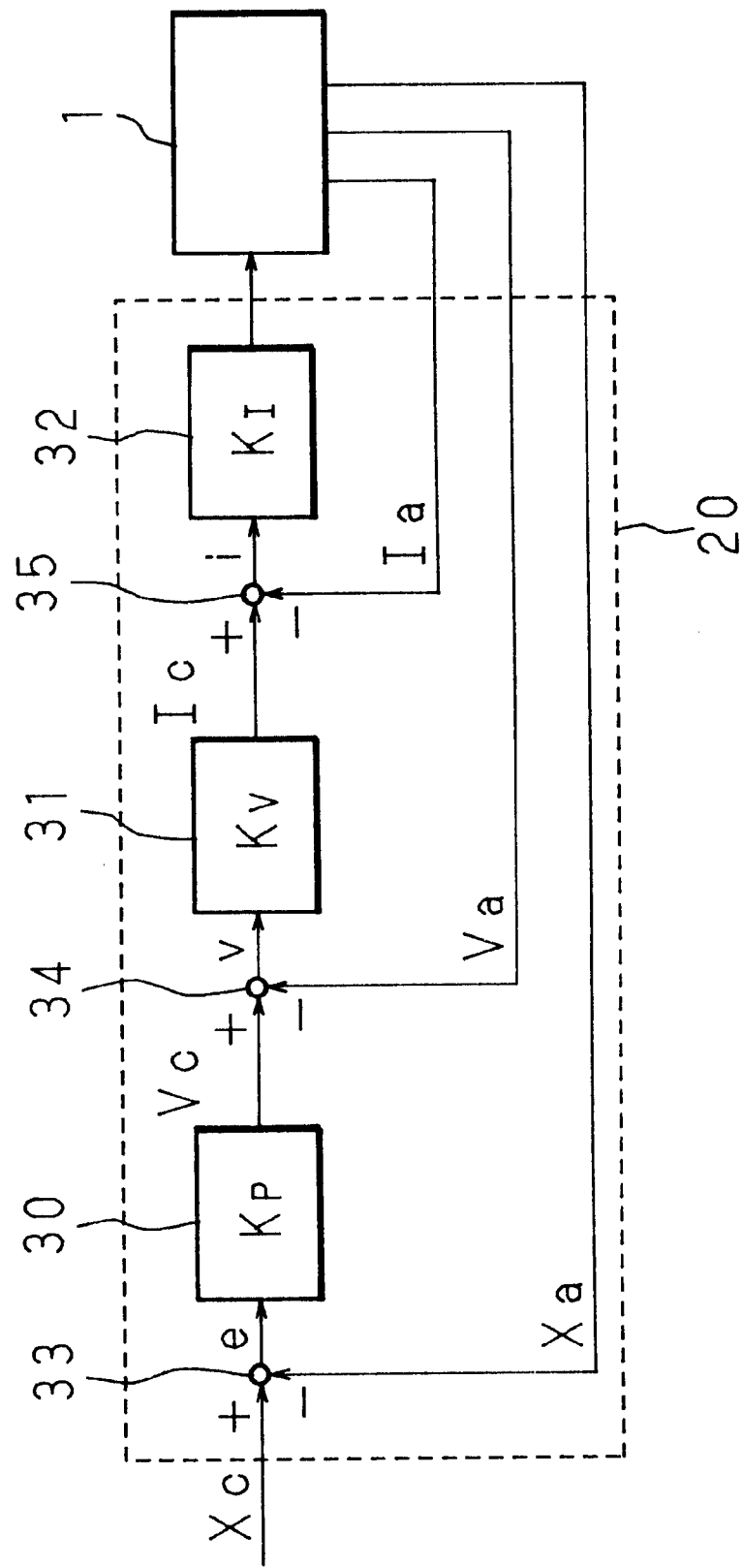
FIG. 2 is a schematic block diagram showing an internal arrangement of a drive controlling unit shown in FIG. 1.

FIG. 2 is a schematic block diagram showing an internal arrangement of the drive controlling unit 20. As shown in the drawing, the drive controlling unit 20 includes proportional elements 30, 31, and 32 having a position loop gain $K_P$, a velocity loop gain $K_V$, and an electric current loop gain $K_I$ as internal loop gains, a subtracter 33 positioned on the input side of the proportional element 30, a subtracter 34 positioned between the proportional elements 30 and 31, and a subtracter 35 positioned between the proportional elements 31 and 32. Moreover, the drive controlling unit 20 supplies signals, which are fed back from the tooling apparatus 1 to which output of the proportional element 32 is supplied as mentioned above, to the subtracters 33, 34, and 35, and is arranged so that triple feedback loops (position loop, velocity loop, and electric current loop) including the proportional elements 30, 31, and 32 inside are formed.

An operating command signal $X_c$ given from the machining condition determining unit 21 is supplied to the subtracter 33. The subtracter 33 outputs the deviation (position deviation e) between the operating command signal $X_c$ and a signal $X_a$ representing the current operating position fed back from the tooling apparatus 1 to the proportional element 30. The proportional element 30 multiplies the position deviation e by the position loop gain $K_P$ so as to convert it into a velocity dimension, and supplies it as a velocity command signal $V_c$ to the subtracter 34.

The subtracter 34 outputs the deviation (velocity deviation v) between the velocity command signal $V_c$ and a signal $V_a$ representing the current operating velocity fed back from the tooling apparatus 1 to the proportional element 31. The proportional element 31 multiplies the Velocity deviation v by the velocity loop gain $K_V$ so as to convert it into a driving current dimension of a corresponding motor (table feed motor $M_1$ or tool feed motor $M_2$), and outputs it as an electric current command signal $I_c$ to the subtracter 35.

The subtracter 35 outputs the deviation (electric current deviation) i between the electric current command signal $I_c$ and a signal $I_a$ representing a current driving electric current fed back from the tooling apparatus 1 to the proportional element 32, and an output which is obtained by multiplying the electric current deviation i by the electric current loop gain $K_I$ in the proportional element 32 is supplied as the driving command signal to a corresponding motor.

As mentioned above, the drive controlling unit 20 generates the driving command signals of the table feed motor $M_1$ and tool feed motor $M_2$ based on the operating command signal $X_c$ supplied from the machining condition determining unit 21 via the triple feedback loops in which the results of detecting the internal states of the servo unit are used as a feedback signal, and outputs the driving command signals, respectively.

Figure 3:
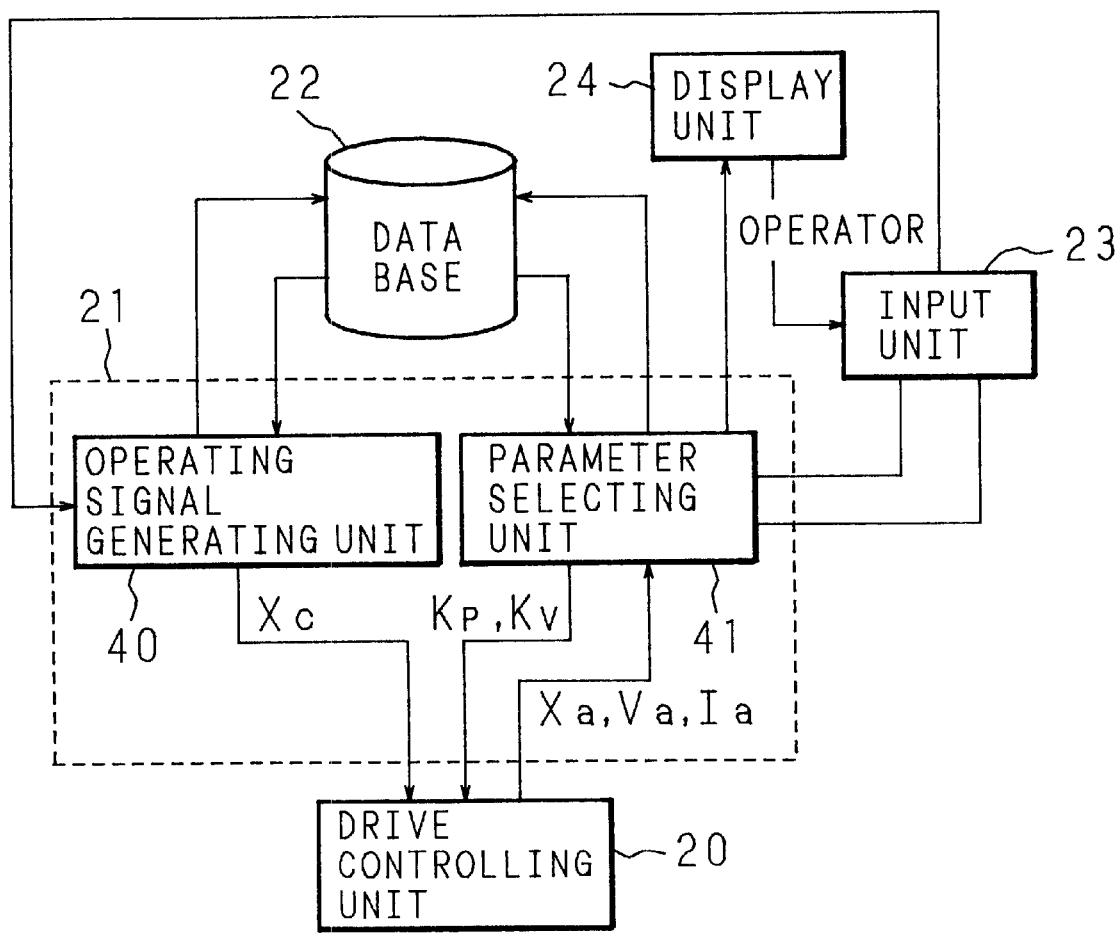
FIG. 3 s a block diagram showing an internal arrangement of a machining condition determining unit shown in FIG. 1.

A machining program described in a machining mode is supplied as an input from the input unit 23 to the machining condition determining unit 21. FIG. 3 is a block diagram showing an internal arrangement of the machining condition determining unit 21.

As shown in the drawing, the machining condition determining unit 21 includes an operating signal generating unit 40 for generating the operating command signal $X_c$ to the drive controlling unit 20 based on the given machining program, and a parameter selecting unit 41 for selecting a plurality of control parameters including the position loop gain $K_P$ and velocity loop gain $K_V$ in the drive controlling unit 20 according to a specified machining mode. The operating signal generating unit 40 and parameter selecting unit 41 are connected to each other so that data can be exchanged with the database 22, and stored data in the database 22 are referred to so that respective operations are performed.

The machining mode given to the parameter selecting unit 41 represents a type of machining performed in the tooling apparatus 1 to be controlled. The parameter selecting unit 41 recognizes at least a type of the cutting tool and workpiece according to the specified machining mode, and selects suitable control parameters from the stored data in the database 22 and supplies the selected control parameters to the drive controlling unit 20 so as to determine them as the position loop gain $K_P$ and velocity loop gain $K_V$.

As shown in FIG. 1, the drilling, which is performed with the drill 10 being mounted as a cutting tool to the spindle head 14, is an important machining mode which usually occupies most part of the entire machining time in a machining center for performing similar machining such as end milling, tapping, reaming, boring, and face milling with respective cutting tools being exchanged. Therefore, in the drilling mode in which a drill is specified as a cutting tool and suitable workpiece is specified, it is required to improve the machining efficiency to the utmost limit under a condition that predetermined accuracy in an over size and depth of a drill hole is secured and that a predetermined tool life, which is determined according to a combination of a material and size of the drill and a material of the workpiece, is secured.

Therefore, in the drilling mode, it is not necessary to increase the position loop gain $K_P$ in the X and Y axes directions, so the position loop gain $K_P$ may be determined to a conventional standard value (=30 to 33/sec) under any conditions. Meanwhile, the position loop gain $K_P$ in the Z axis direction should be determined to a value as large as possible considering the material of the drill 10 to be used in order to improve the machining efficiency to the utmost limit while securing the tool life. If the material of the drill 10 is of high-speed steel, approximately $K_P$=60/sec may be appropriate, and if the material is a sintered carbide alloy, approximately $K_P$=30/sec may be appropriate.

The database 22 stores the control parameters which were determined based on the aforementioned basic idea and compensated based on results of such as the internal states of the servo unit during actual machining and a result of measuring machinery characteristics of the tooling apparatuses 1 to be controlled.

Figure 4:
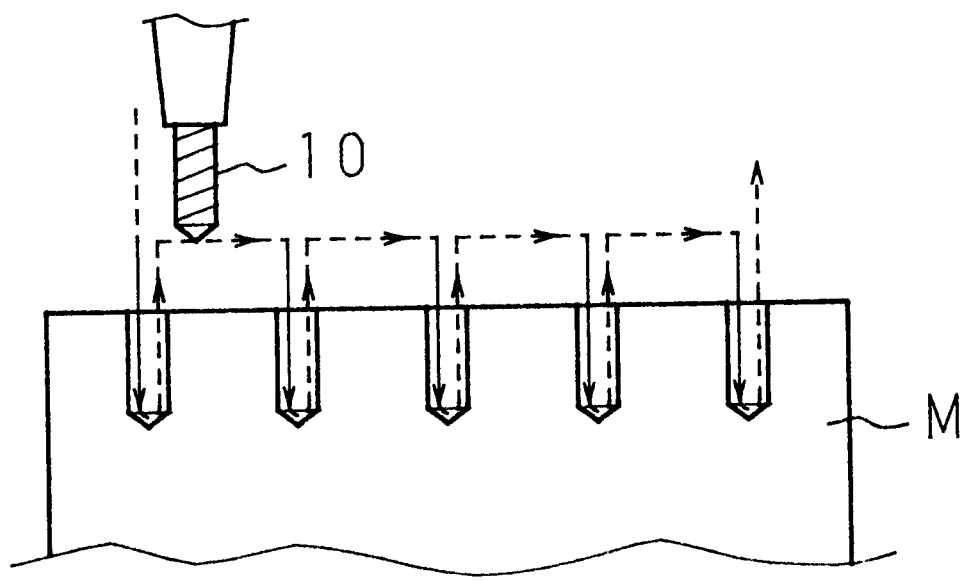
FIG. 4 is a drawing showing a tool path in one example of a drilling according to the present invention.

FIG. 4 shows a tool path in the case where many tapped holes which are required for fixing another member such as a cylinder head to a cylinder block (made of FC250) of an automobile as the workpiece M by screws as one example of the drilling.

The path represented by a continuous line in FIG. 4 shows a tool path in actual cutting, and a path represented by a broken line shows a tool path in no machining such as retrieving and moving of the drill to another machining position after cutting. Such a tool path of the tooling apparatus 1 shown in FIG. 1 is obtained by a combination of the aforementioned operations of the machining table 11, spindle head 14, and drill 10, so it is clear that the machining efficiency can be improved to the utmost limit by adopting a machining condition that the table feed motor $M_1$, tool feed motor $M_2$, and spindle motor $M_3$ which are driving sources thereof are driven at the maximum speeds and maximum accelerations possible.

However, actually, a vibration is generated in the machining table 11 and spindle head 14 by moving at high acceleration, and a large cutting force is applied to the drill 10 as a machining end, so the drill 10 might be broken, thus it is mostly impossible to obtain the aforementioned machining condition.

Therefore, the parameter selecting unit 41 determines the machining condition which can be obtained in actual machining, more specifically the cutting speed and feed per rotation by referring to the database 22 based on the combination of the drill 10 as a cutting tool and the workpiece M under a condition that the drill 10 is not broken.

For example, when the tool path shown in FIG. 4 is adopted, a high speed machining center, in which the maximum feed rate is 60 m/min, the maximum acceleration rate is 1.0 G, and the maximum spindle speed is 20,000 rev/min, is used as the tooling apparatus 1, and a drill hole (prepared hole for M10 screw), in which the diameter is 8.5 mm and the depth is 25.5 mm, is formed on a cylinder block as the workpiece M made of cast iron (FC250) by a sintered carbide drill with (Al, Ti) N coating, the machining condition is determined as follows:

Cutting speed: 267 m/min (n=10, 000/min)
Feed per rotation: 0.3 mm/rev.

After the machining condition is determined in such a manner, the control parameters including the position loop gain $K_P$ and velocity loop gain $K_V$ are selected within a range previously determined according to the characteristic of the tooling apparatus 1 under a condition that the maximum acceleration rate of 1.0 G which can be obtained is adopted as follows:

$K_P$=33(1/s), $K_V$=350(1/s), $T_{s1}$=100 ms, and $T_{s2}$=28 ms.

Here, $T_{s1}$ and $T_{s2}$ are the first and second order time constants of "S"-shaped adjustable speed, mentioned later.

In addition, when the same drill hole is formed on the workpiece M made of an aluminum alloy including 11% of Si, the machining condition and control parameters are determined as follows:

Cutting speed: 534 m/min (n=20,000/min)
Feed per rotation: 1.0 mm/rev
Position loop gain $K_P$: 33/s
Velocity loop gain $K_V$: 350/s
First order time constant $T_{s1}$: 100 ms
Second order time constant $T_{s2}$: 28 ms.

Here, as a result of machining actually under the above condition, the cutting force which was presumed from an electric current value of the tool feed motor (Z axis servo motor) $M_2$ became excessive, so the machining was performed with the feed per rotation being reduced to 0.8 mm/rev.

In order to improve the machining efficiency of the drilling under the machining condition which was determined as mentioned above so that the drill 10 is prevented from being broken, it is effective to reduce a time required for operation in the operating path during non-machining performed along the path represented by a broken line in FIG. 4. As mentioned above, a velocity which is as high as possible is adopted by determining the high velocity loop gain $K_V$ so that the machining efficiency is improved.

Moreover, when the drill 10 is retrieved after cutting which is one step during non-machining, it is necessary to switch into an operation in an opposite direction to that during cutting. In the case where the switching is not made rapidly, the drill 10 is rotated with its point being brought into contact with the bottom of the drill hole which was formed, namely, "rubbing", occurs, and thus a friction distance of the bottom surface of the drill is increased, and that exercises a undesirable influence to the life of the drill 10.

Figure 5A:
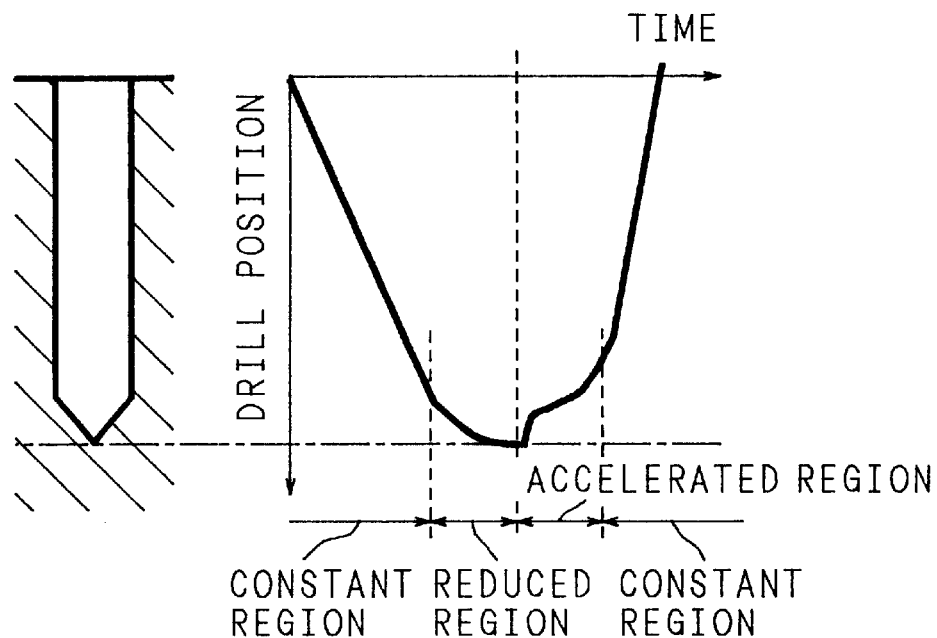
FIG. 5A is a drawing showing a feeding operation of the drill according to the present invention.
Figure 5B:
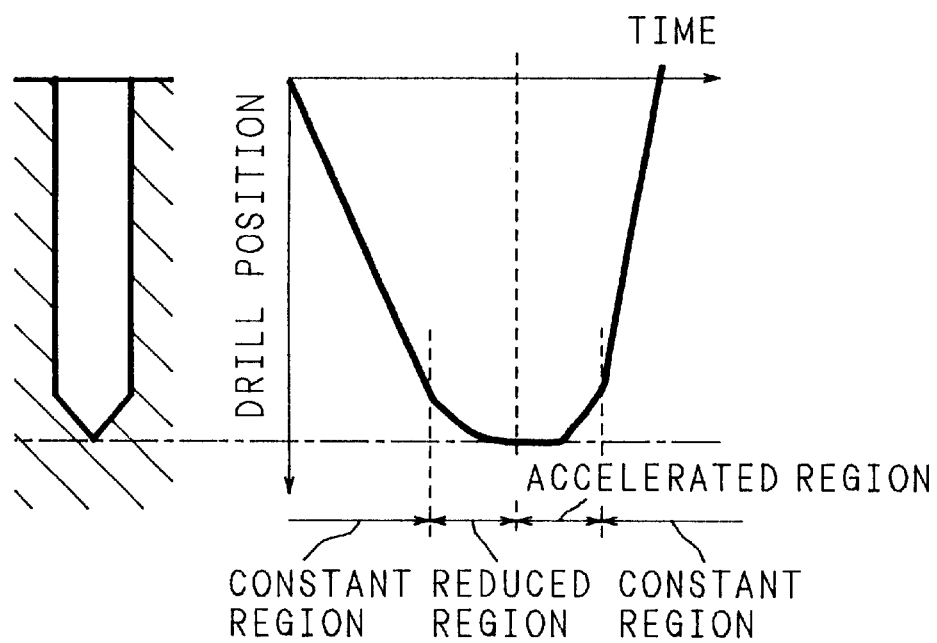
FIG. 5B is a drawing showing a feeding operation of the conventional drill.

FIG. 5A shows the rapid retieval of the drill 10 in the present invention, and FIG. 5B shows the feed of the drill 10 in the conventional drilling.

In these drawings, a horizontal axis represents time, and a vertical axis represents a position of the point of the drill 10 in the Z axis direction. In the conventional drilling shown in FIG. 5B, as for the drill 10, which moves from the surface of the workpiece M at a substantially constant feed rate (inclination), its feed rate is reduced as it becomes closer to a hole bottom position represented by an alternate long and short dashed line in the drawing, and after the feed rate is lost so that the drill 10 reaches the hole bottom position, then it is accelerated gradually to the opposite direction so that the feed rate reaches a predetermined velocity, and with this feed rate being maintained, the drill 10 follows a path where it is retrieved from the workpiece M.

On the contrary, in the tooling apparatus 1 of the present invention, the drill 10, which reaches the hole bottom position via the constant feed rate region and the reduced feed rate region is, as shown in FIG. 5A, drawn back instantly by a predetermined length with the maximum horse power of the tool feed motor $M_2$, and it follows a path where it is retrieved from the workpiece M via the accelerated feed rate region and constant feed rate region similarly to the conventional one. Therefore, it is possible to greatly reduce a time that the drill 10 is rotated with its point being brought into contact with the bottom of a drill hole formed by feed operation from the constant feed rate region to the reduced feed rate region, and thus the wear of the point of the drill 10 can be greatly reduced.

Figure 6A:
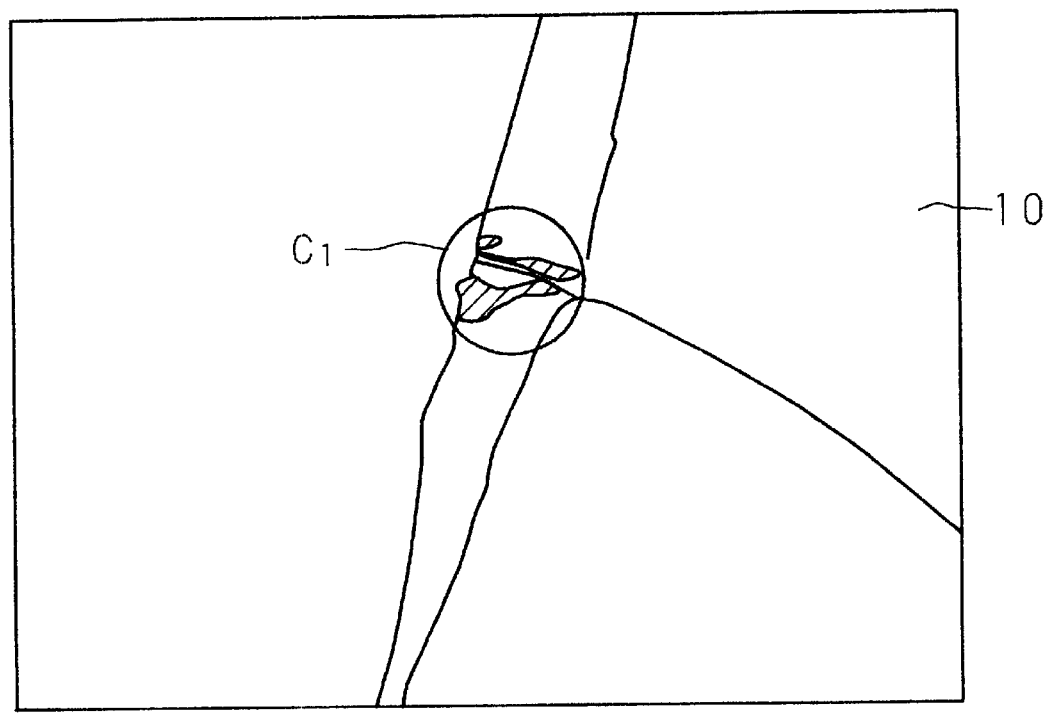
FIG. 6A is a drawing showing a result of a proof experiment when comparing a degree of wear at the point of the drill in the case where the drilling is performed by the feeding operation shown in FIG. 5A.
Figure 6B:
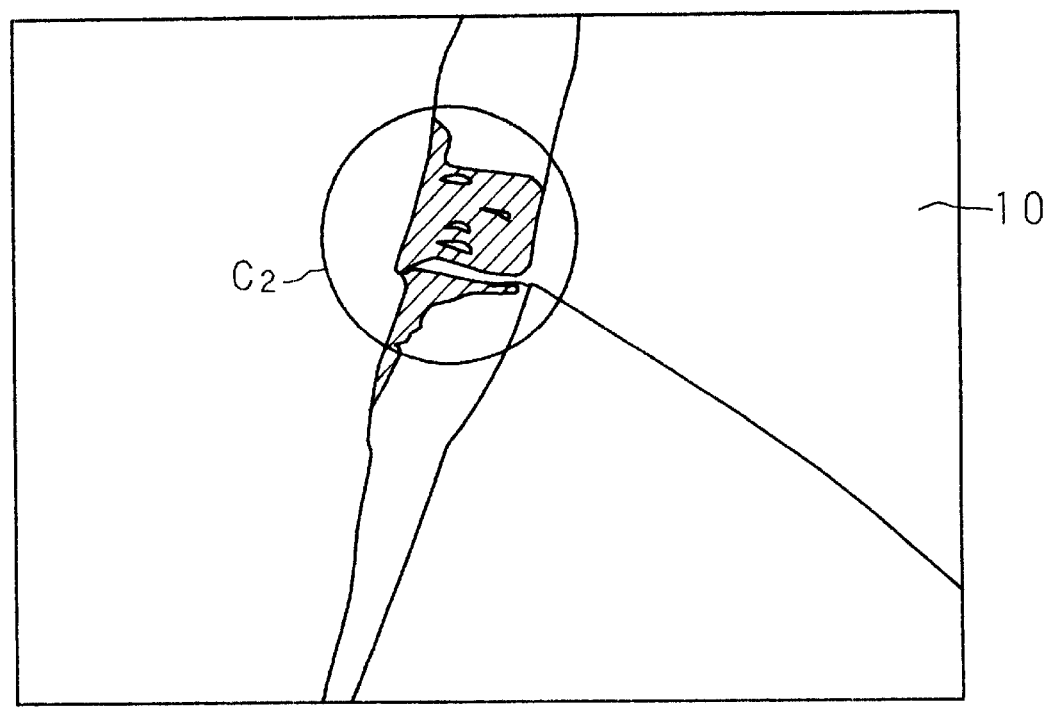
FIG. 6B is a drawing showing a result of a proof experiment when comparing a degree of wear at the point of the drill in the case where the drilling is performed by the feeding operation shown in FIG. 5B.

FIG. 6A and 6B show the results of a proof experiment in which the degrees of wear on the point of the used drill are compared in the case where the drilling is performed by the feed operation shown in FIGS. 5A and 5B. This proof experiment was performed in such a manner that a cylinder block made of FC250 was used as a workpiece, and the degrees of wear on the point of the drill were compared after 2,801 prepared bolt holes with a depth of 25.5 mm were formed successively by using a sintered carbide drill with (Al, Ti) N coating under the machining condition that the cutting speed 150 m/min and feed rate (per rotation) is 0.3 mm/rev. Moreover, FIGS. 7A and 7B show reference pictures of FIGS. 6A and 6B, respectively.

Figure 7A:
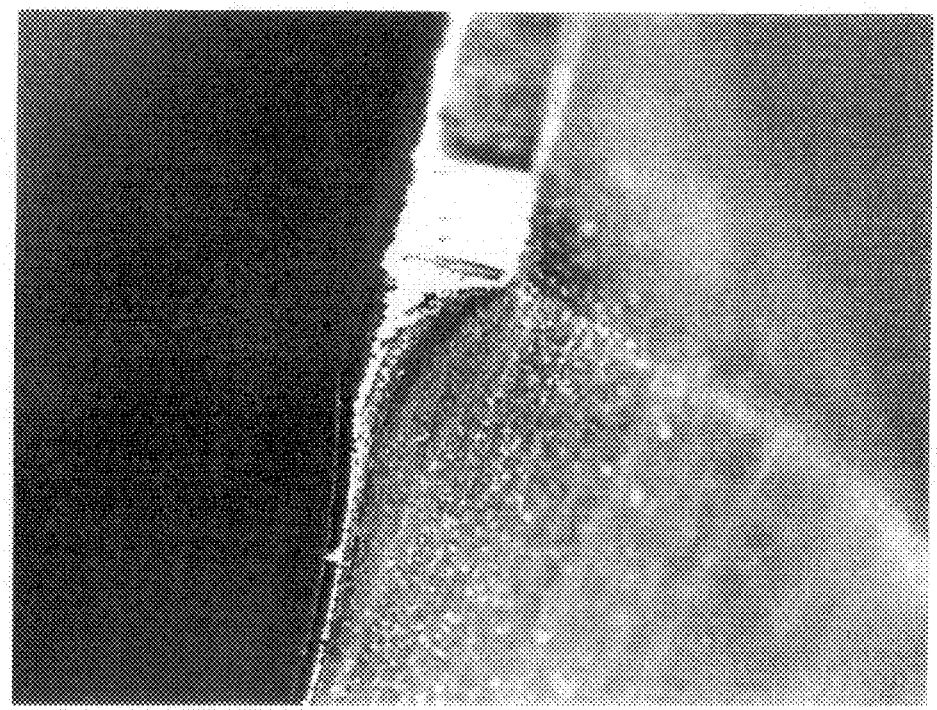
FIG. 7A is a reference picture showing FIG. 6A.
Figure 7B:
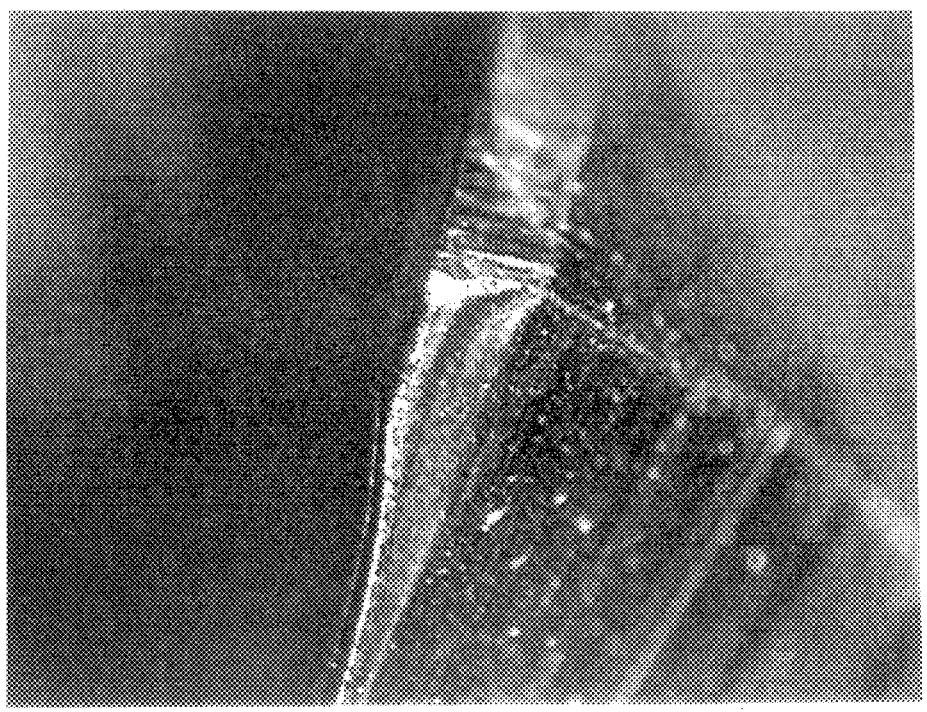
FIG. 7B is a reference picture showing FIG. 6B.

FIGS. 6A and 7A show results in the case where the feed operation of the drill is performed as shown in FIG. 5A. In this case, only a slight wear is occurred on the point of the drill as shown by $C_1$ in the drawings. FIGS. 6B and 7B show results in the case where the feed operation of the drill is performed as shown in FIG. 5B. In this case, as shown by $C_2$ in the drawing, compared with FIGS. 6A and 7A, wear with larger widths in a lead direction and a direction intersecting perpendicularly to the lead direction is occurred on the point of the drill 10.

As the result of the experiment, in the tooling apparatus 1 of the present invention, when the control parameters are selected in the parameter selecting unit 41 of the numerical controlling unit 2 as mentioned above, the wear of the tool can be greatly reduced, thus it is clear that the tool life is increased and at the same time the machining with high efficiency can be obtained.

The aforementioned combinations of the control parameters are previously obtained so as to accord with various combinations of the drill 10 and workpieces M, and these results are stored in the database 22. When the machining mode is given to the parameter selecting unit 41, the parameter selecting unit 41 first determines the machining conditions, and selects the control parameters which accord with the machining conditions by referring to the stored data in the database 22 so as to determine the control parameters in the drive controlling unit 20.

Moreover, the feedback signals ($X_a$, $V_a$, and $I_a$) representing the internal states of the servo unit are given to the parameter selecting unit 41 via the drive controlling unit 20, and the parameter selecting unit 41 judges as to whether or not the previously selected control parameters are suitable based on the feedback signals. This judgment is made by, for example, monitoring an electric current value of the drive motor (spindle motor $M_3$) of the spindle 15 and an electric current value of the drive motor (tool feed motor $M_2$) of the spindle head 14 during the machining operation. If the control parameters are excessive (or insufficient), first the determined machining conditions are relieved (or strengthened), and the control parameters according to the machining conditions are selected so as to be redetermined in the drive controlling unit 20.

The machining conditions are previously obtained so as to accord with the various combinations of the drill 10 and workpiece M, and they are stored in the database 22. The machining conditions are determined in the parameter selecting unit 41 by reading out data which accord with the machining mode from the database 22, but a cutting force generated between the drill 10 and workpiece M might be changed within the range of the respective material characteristics. The aforementioned relieving or strengthening of the machining conditions, and the redetermination of the control parameters according to the machining conditions are a kind of adaptive control which is made in order to take a measure against a change in the cutting force due to a difference of the material characteristics.

Figure 8:
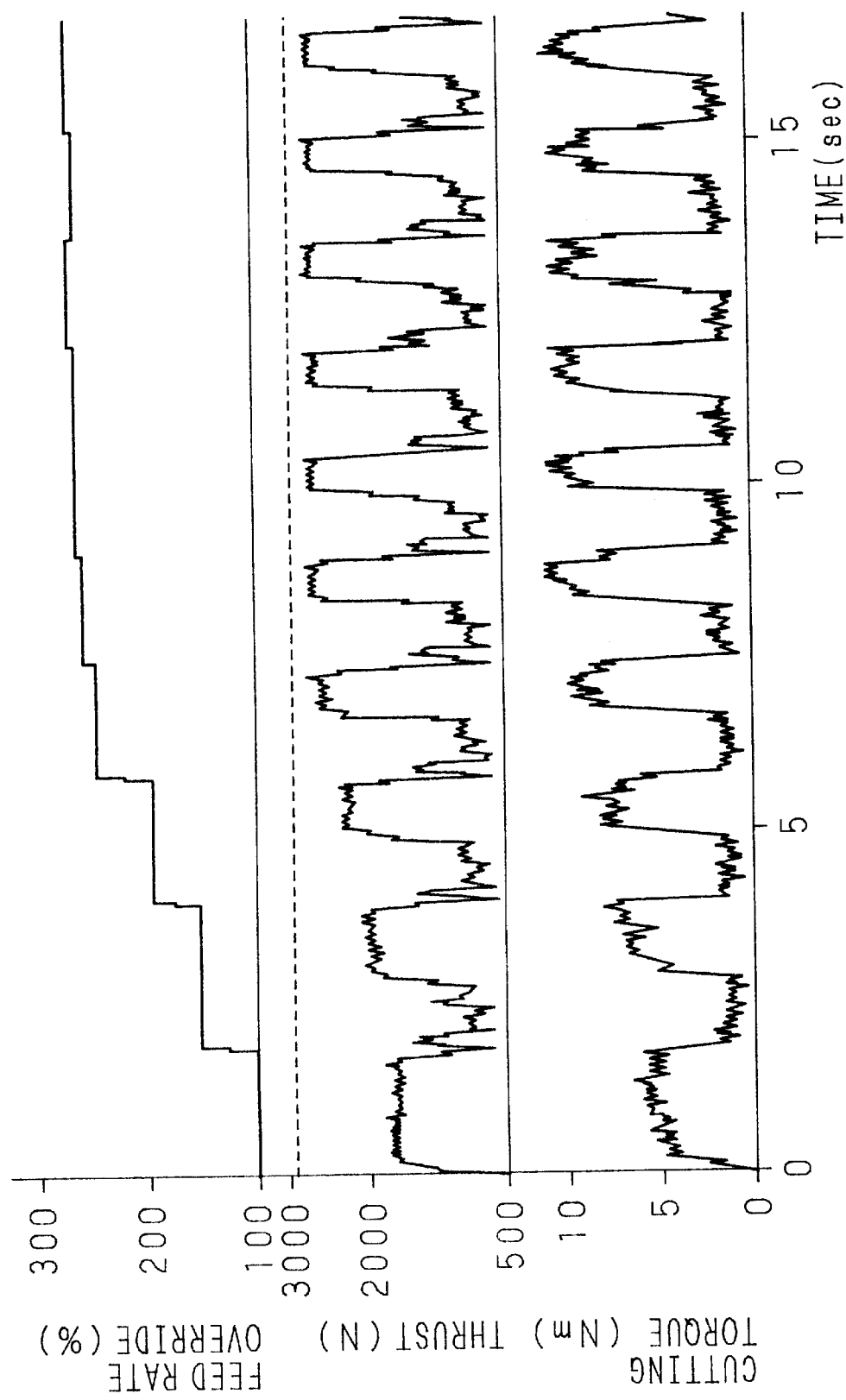
FIG. 8 is a drawing showing a change of state occurred during the drilling according to the present invention.

FIG. 8 is a drawing showing a change of state generated during the drilling due to such adaptive control. The drawing shows a process for continuously forming prepared bolt holes with depth of 25.5 mm on the workpiece made of FC250 under the feed condition that the sintered carbide drill with (Al, Ti) N coating whose diameter is 8.5 mm is used, the cutting speed is 150 m/min and initial feed rate is 0.3 mm/rev. As a result of making a kind of the adaptive control as mentioned above, the feed of the drill is changed, and thus it is clear that thrust and cutting torque which are applied to the drill are changed.

In the parameter selecting unit 41, at the time of the first machining performed after the initial control parameters are selected, for example, a thrust applied to the drill is recognized, and the thrust is compared with an upper limit value represented by a broken line in the drawing so that the feed rate is overridden according to the difference. As a result of this process, in the drawing, the feed rate is overridden until the fifth machining in which the thrust reaches the vicinity of the upper limit value, and thereafter machining is performed at a feed rate which was overridden approximately 260% with respect to the initially determined value, so a time required for machining can be, greatly reduced.

The thrust can be obtained from the electric current value of the tool feed motor $M_2$, and the aforementioned adaptive control can be made by utilizing an internal sensor originally included in the tooling apparatus 1. Moreover, instead of the thrust, the similar control can be made based on a detected result of a cutting torque, and also in this case, the cutting torque can be detected as the electric current value of the spindle motor $M_3$ by the internal sensor originally included in the tooling apparatus 1, so the adaptive control can be made without using an extraordinary external sensor.

Moreover, the output of the parameter selecting unit 41 is supplied also to the display unit 24, and the display unit 24 performs predetermined display according to a display command outputted by the parameter selecting unit 41. This display command is generated by judging the internal states of the servo unit according to the feedback signals ($X_a$, $V_a$, and $I_a$) when the capability of the tooling apparatus 1 is sufficient, and a suitable message such that more severe machining conditions can be determined is displayed on the display unit 24 according to the display command.

When an operator confirms the above display on the display unit 24, the operator performs a predetermined operation on the input unit 23 so as to be able to command a redetermination of the machining conditions. According to this command, the parameter selecting unit 41 changes the machining conditions, again selects the control parameters according to this change, determines the control parameters in the drive controlling unit 20, supplies the selected control parameters to the database 22 so as to update the stored data in the database 22.

In this operation, for example, in the case where machining is performed by adopting the drill 10 using a new tool material, first, a machining mode which is close to the machining is specified so that the machining is started. Then, the data of the machining conditions and control parameters which are proper for the combinations of the drill 10 and workpiece M are taken from the results of detecting the internal states of the servo unit obtained during actual machining, and this shows that the stored data in the database 22 are updated, so the stored data can be prevented from becoming obsolete due to improvement in machining technologies.

A similar operation is performed also when the cutting force is reduced due to a difference in material characteristics, but as mentioned above, the stored data in the database 22 are updated by the operator via the input unit 23 under the condition that a predetermined operation is performed, so the stored data might not be updated idly as long as after the machining mode is recognized, the operation is performed.

Meanwhile, the end milling as another machining performed in the machining center is mostly used for finishing the contour of the workpiece M, and it is more important to improve the machining accuracy as well as to improve the machining efficiency, so it is required to reduce tracking errors in the servo unit of the tooling apparatus 1 controlled by the operation of the drive controlling unit 20 as low as possible.

A value of the tracking error d is obtained by the following equation:

$$\frac{d_{li}}{F} = (T_s + T_p) - \frac{T_s^2}{T_s - T_p}\exp(-t/T_s) - \frac{T_p^2}{T_p - T_s}\exp(-t/T_p). \quad (1)$$

When time t is infinite, the tracking error d obtained by the equation (1) is represented by the following equation:

$$d = (T_s + T_p)F \quad (2).$$

Here Ts is an adjustable speed time constant after interpolation, and the relationship that $T_P = 1/K_P$ holds.

The tracking error d under such a condition, namely, in a steady state, can be reduced by using feedforward control, but in the end milling which causes a non-steady change in state such as a disturbance change and a rapid path change, the effect that the tracking error d is reduced by the feedforward control cannot be expected. Therefore, the tracking error d is reduced by adjusting gains, mentioned below, in the drive controlling unit 20 shown in FIG. 2.

The tracking error d must be the position deviation e to be inputted to the proportional element 30 as deviation between the operating command signal $X_c$ given to the drive controlling unit 20 and the operating position signal $X_a$ fed back from the tooling apparatus 1. Therefore, the tracking error d can be reduced by making the position loop gain $K_P$, which is determined in the proportional element 30 to which the tracking error d is inputted, to be large.

However, in order to making the position loop gain $K_P$ to be large without damaging the stability of the control system, it is necessary to increase the position loop gain $K_P$ with the following relationship between the position loop gain $K_P$ and the velocity loop gain $K_V$ determined in the proportional element 31 connected to the back stage of the proportional element 30 being maintained the relation ship between them as the equation as follows:

$$K_V = (3 \text{ to } 4)K_P \quad (3).$$

Figure 9:
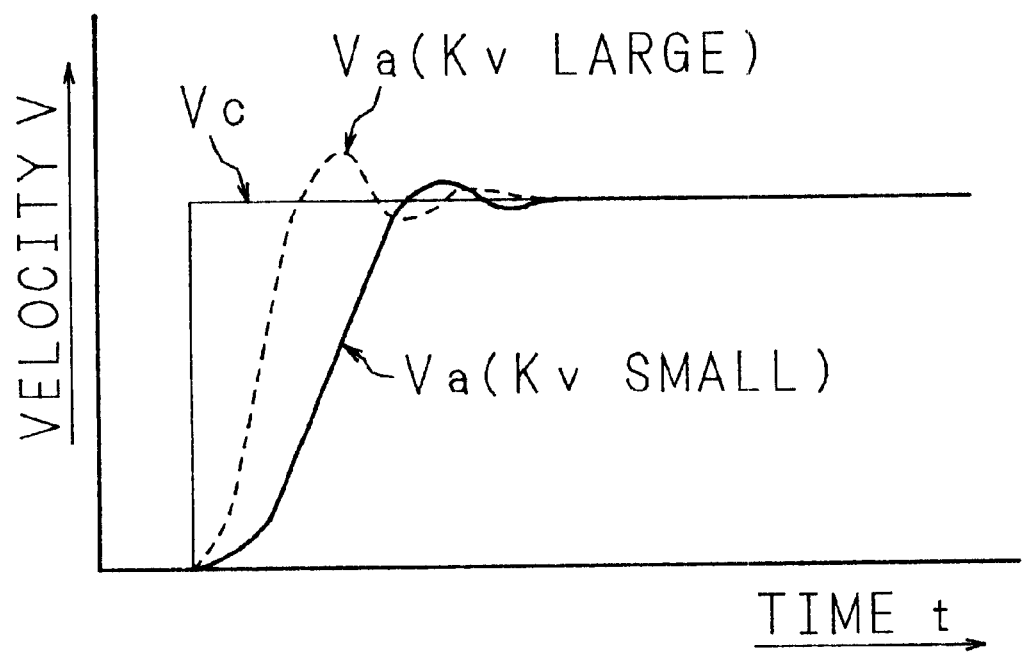
FIG. 9 is a drawing showing a change with time speed in a servo unit according to the present invention.

FIG. 9 is a drawing showing a state of the speed change with time in the servo unit. When the velocity command $V_c$ of step form shown in the drawing is given, the velocity $V_a$ actually, which is obtained in the servo unit according to the velocity command $V_c$, is as represented by a broken line in the drawing when the velocity loop gain $K_V$ is large, and it is as represented by a continuous line in the drawing when the velocity loop gain $K_V$ is small.

As is clear from the comparison with them, a time until first reaching a target velocity corresponding to the velocity command $V_c$ is shorten by increasing the velocity loop gain $K_V$, but when the velocity loop gain $K_V$ is large, after reaching the target velocity, great vibration occurs before and after reaching the target velocity, and thus a time required for settling the vibration becomes longer. The position accuracy is given as a time integral value of the above velocity response, and the improvement in the position accuracy by increasing the velocity loop gain $K_V$ is limited. Therefore, the velocity loop gain $K_V$ should be increased to an upper limit value where the stable operating of the servo unit is not damaged.

As mentioned above, when the end milling mode is specified, the velocity loop gain $K_V$ is increased within a range which does not exceed the upper limit value with the equation (3) holding between the position loop gain $K_P$ and velocity loop gain $K_V$. As a result, the requirement that high machining accuracy can be obtained considering long tool life and shortening of the machining time clan be achieved.

In the finishing of the workpiece M performed by using the end mill, it is important to improve the machining accuracy, and it is necessary to make the position loop gain $K_P$ to be maximum within the range that the stability of the control system is not damaged, thus, for example, determining as approximately $K_P$=70/sec may be appropriate. In three-dimensional machining using a ball end mill, in order to obtain a higher machining accuracy, all the position loop gains $K_P$ in the X, Y, and Z axes directions are determined to the maximum value, and the feed rate is determined to a maximum value which is limited by a definition expression of a contour motion error, mentioned later. In the general end milling which only requires the machining accuracy in the two dimension, as for the X and Y axes directions, the position loop gain $K_P$ and the feed rate are determined similarly, and as for the Z axis direction, only the position loop gain $K_P$ may be determined.

The database 22 stores the control parameters which were determined based on the aforementioned basic idea similar to the case of the drilling, and were compensated based on the results of detecting the internal states of the servo unit at the time of actual machining and the results of measuring the machine characteristics of the tooling apparatus 1 to be controlled.

Figure 10:
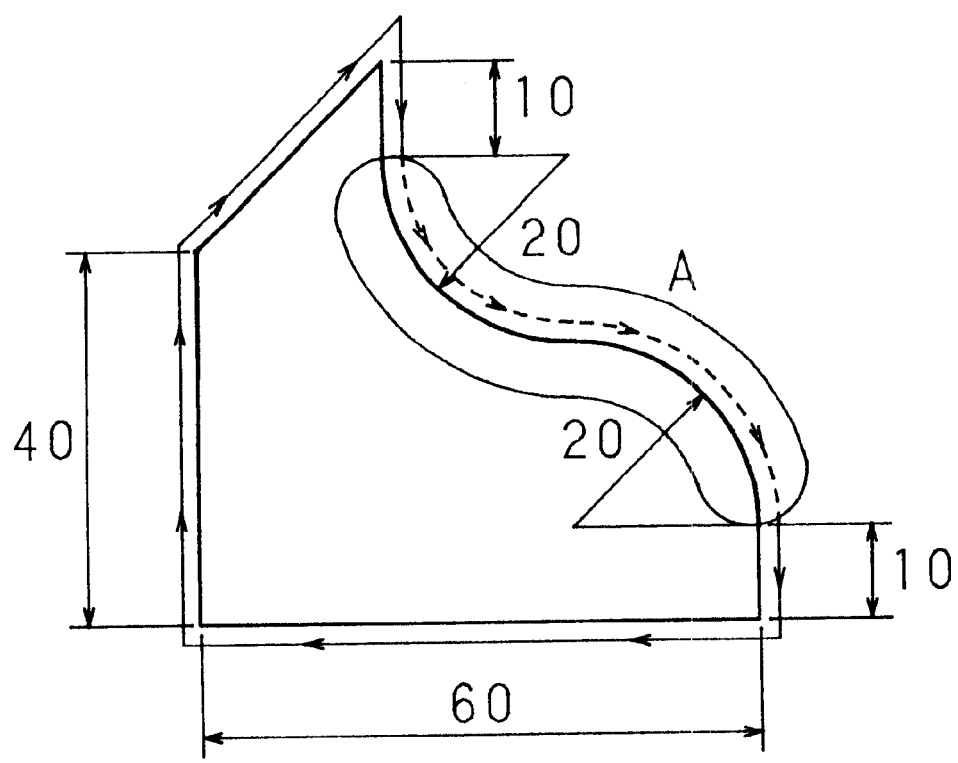
FIG. 10 is a drawing showing a tool path in one example of an end milling according to the present invention.

As one example of the end milling, the description will be given as to the case where a board material made of die steel (SKD63, hardness $H_{RC}$=53) with a thickness of 20 mm is cut by using a sintered carbide end mill (four cutting blades) with (Al, Ti) N coating whose diameter is 12 mm and projecting value is 4 mm, and a board cam C having an outer shape shown in FIG. 10 is produced with machining accuracy that contour accuracy of not more than 10 $\mu$m. Here, the tooling apparatus is the high-speed machining center which is the same one used in the aforementioned drilling.

A tool path of this machining is composed of a combination of a linear interpolation feed path (G01) represented by a continuous line in FIG. 10 and a circular interpolation feed path (G02) represented by a broken line in the same drawing.

The cutting speed can be determined to a maximum value which is allowable in the machining center by the combinations of the cutting tool (sintered carbide end mill) and workpiece, and the feed rate per cutting blade should be determined by restricting the roughness of the machined surface. They are determined, for example, as follows:

Number of revolution of spindle: 20,000/min

Feed rate per cutting blade: 0.1 m/cutting blade.

In this machining, the most important restrained condition is that the contour accuracy is maintained not more than 10 $\mu$m, the feed rate in the portion A in FIG. 10 where the circular interpolation feed is executed, is restricted by the definition expression of the contour motion error as the equation as follows:

$$\Delta R = \frac{F^2}{2R}\left(T_S^2 + \frac{1}{K_{p2}}\right). \quad (4)$$

In order to make the feed rate F to be maximum, the position loop gain $K_P$ included in the equation (4) should be determined to a maximum value which is allowed by the characteristic of the end mill as the tooling apparatus 1, and the time constant $T_s$ should be determined to a minimum value (=0). The contour accuracy $\Delta R$ is limited to 10 $\mu$m=0.01 mm, and when the position loop gain $K_P$ is determined to 70 (1/s), the allowable maximum feed rate becomes 2.2 m/min. In this case, the allowable number of rotation of the spindle becomes 5,500 to 20,000/min according to the feed rate per cutting blade (0.1 mm/cutting blade) limited as mentioned above.

In order to improve the machining accuracy in the end milling, it is necessary to restrain run-out due to whirling of the end mill small, and by adding this condition, the number of rotation of the spindle is selected to 7,000/min. Further, since a stick motion which exerts a bad influence on the machining accuracy changes with the feed rate, a stick motion compensating amount is determined to 10 $\mu$m according to the feed rate of 2.2 m/min.

Here, in the case where an end mill whose diameter is 24 mm is used for similar machining instead of the aforementioned end mill with diameter of 12 mm, the feed rate in the portion A where the circular interpolation feed is executed, and the stick motion compensating amount which is determined by the feed rate become as follows:

Feed rate: 1.2 m/min

Stick motion compensating amount: 7 $\mu$m.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A numerical controlling device used in a tooling apparatus in order to perform a predetermined machining to a workpiece on a machining table by bringing a cutting tool into contact with the workpiece, comprising:

means for numerically specifying an operating path for operating the cutting tool and/or the machining table;

a database having a control parameter relating to an operating speed for operating the cutting tool and/or the machining table, said control parameter includes a servo gain and a time constant of adjustable speed;

specifying means for specifying a machining mode including types of the cutting tool and/or the workpiece;

selecting means for selecting the control parameter based on said database so as to obtain an adequate operating speed in the entire operating path during machining and non-machining according to the specification by said specifying means; and means for outputting a control command to said tooling apparatus so as to operate the cutting tool and/or the machining table with the operating speed based on the control parameter selected by said selecting means.

2. The numerical controlling device according to claim 1, wherein the control parameter includes:

a position loop gain to be multiplied in order to obtain a position changing command based on an operating position command; and a velocity loop gain to be multiplied in order to obtain the operating speed command based on the position changing command obtained from said position loop gain, wherein the servo gain includes the position loop gain and the velocity loop gain, and the time constant of adjustable speed includes a first and second order time constants of S-shaped adjustable speed and the time constant of adjustable speed after interpolation.

3. The numerical controlling device according to claim 2, wherein a time constant of the position loop is selected so that a time constant of the position loop is decreased as small as possible and machining time based on the time constant of the position loop becomes minimum.

4. The numerical controlling device according to claim 2, further comprising:
- a servo unit for driving the cutting tool and/or the machining table;
- detecting means for detecting internal state of said servo unit; and
- updating means for updating stored data in said database based on the result detected by said detecting means.

5. The numerical controlling device according to claim 1, further comprising:
- a servo unit for driving the cutting tool and/or the machining table;
- detecting means for detecting internal state of said servo unit; and
- updating means for updating stored data in said database based on the result detected by said detecting means.

6. The numerical controlling device according to claim 5, wherein said updating means includes:
- a display unit for displaying that the updating is possible; and
- an input unit for accepting an operation by an operator,
- wherein the updating is performed based on the predetermined operation on said input unit operated according to the display on said display unit.

7. A tooling apparatus for performing a predetermined machining to a workpiece on a machining table, comprising:
- a machining table for fixing the workpiece;
- a cutting tool enable to be brought into contact with the workpiece for the machining;
- means for numerically specifying an operating path for operating said cutting tool and/or said machining table;
- a database having a control parameter relating to an operating speed for operating said cutting tool and/or said machining table, said control parameter includes a servo gain and a time constant of adjustable speed;
- specifying means for specifying a machining mode including types of said cutting tool and/or the workpiece;
- selecting means for selecting the control parameter based on said database so as to obtain an adequate operating speed in the entire operating path during machining and non-machining according to the specification by said specifying means; and
- means for performing the predetermined machining by operating said cutting tool and/or said machining table with the operating speed based on the control parameter elected by said selecting means.

8. The tooling apparatus according to claim 7, wherein the control parameter includes:
- a position loop gain to be multiplied in order to obtain a position changing command based on an operating position command; and
- a velocity loop gain to be multiplied in order to obtain the operating speed command based on the position changing command obtained from said position loop gain, wherein the servo gain includes the position loop gain and the velocity loop gain, and the time constant of adjustable speed includes a first and second order time constants of S-shaped adjustable speed and the time constant of adjustable speed after interpolation.

9. The tooling apparatus according to claim 8, wherein a time constant of the position loop is selected so that a time constant of the position loop is decreased as small as possible and machining time based on the time constant of the position loop becomes minimum.

10. The tooling apparatus according to claim 8, further comprising:
- a servo unit for driving said cutting tool and/or said machining table;
- detecting means for detecting internal state of said servo unit; and
- updating means for updating stored data in said database based on the result detected by said detecting means.

11. The tooling apparatus according to claim 7, further comprising:
- a servo unit for driving said cutting tool and/or said machining table;
- detecting means for detecting internal state of said servo unit; and
- updating means for updating stored data in said database based on the result detected by said detecting means.

12. The tooling apparatus according to claim 11, wherein said updating means includes:
- a display unit for displaying that the updating is possible; and
- an input unit for accepting an operation by an operator,
- wherein the updating is performed based on the predetermined operation on said input unit operated according to the display on said display unit.

* * * * *

UNITED STATES PATENT AND TRADEMARK OFFICE
CERTIFICATE OF CORRECTION

PATENT NO.    : 6,501,997 B1
DATED         : December 31, 2002
INVENTOR(S)   : Kakino It is certified that error appears in the above-identified patent and that said Letters Patent is hereby corrected as shown below:

<u>Title page,</u>
Item [73], please add the following Assignees:
-- Mori Seiki Co., LTD., Yamatokoriyama, JP
  Yamazaki Mazak Corp., Niwa-gun, JP
  Yasda Precision Tools K.K., Asaguchi-gun, JP --

Signed and Sealed this

Thirteenth Day of May, 2003

JAMES E. ROGAN
*Director of the United States Patent and Trademark Office*